United States Patent Office 3,505,360
Patented Apr. 7, 1970

3,505,360
DECOMPOSITION OF HYDROPEROXIDES
Kenneth Allison and Maurice Barrington Sparke, Sunbury-on-Thames, Middlesex, England, assignors to The British Petroleum Company Limited, London, England, a corporation of England
No Drawing. Continuation-in-part of application Ser. No. 324,838, Nov. 19, 1693. This application Oct. 6, 1966, Ser. No. 584,686
Claims priority, application Great Britain, Nov. 20, 1962, 43,829/62
Int. Cl. C07d 1/18, 1/12, 1/08
U.S. Cl. 260—348.5           10 Claims

ABSTRACT OF THE DISCLOSURE

A process for the decomposition of alkenyl hydroperoxides resulting in the production of decomposition products containing epoxy alcohols by heating a preformed feedstock derived from the autoxidation of straight chain, branched chain or cyclic mono-olefins, with the feedstock containing, as the reactive component, a mono-alkenyl hydroperoxide in the presence of a catalyst based on a metal or compound of a metal of Group IV-A, V-A or VI-A, excepting chromium. The hydroperoxide is rearranged to give an epoxy alcohol having the same carbon number as the hydroperoxide and in which there is a vicinal epoxy group adjacent to a carbon atom carrying the hydroxyl group. The preformed feedstocks are generally heated at temperatures in the range 20–150° C. to effect the desired rearrangement. The rearrangement of the hydroperoxide to the epoxy alcohol facilitates recovery of the olefin for recycle to the oxidation zone in a process in which the crude oxidate is to be worked-up to desired oxy-compounds.

This invention relates to the decomposition of organic hydroperorides and particularly to the decomposition of alkenyl hydroperoxides.

This application is a continuation-in-part of copending application Ser. No. 324,838, filed November 19, 1963, now abandoned.

The thermal decomposition of certain alkenyl hydroperoxides has been reported. Thus the decomposition of the primary hydroperoxide

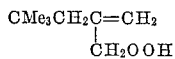

as a 1% solution in benzene at 100° C., is reported to give a 97% yield of

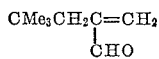

Further the thermal decomposition of cyclohexenyl hydroperoxide is reported to give 70% cyclohexenone and 30% cyclohexenol, and the catalysed decomposition with ferrous phthalocyanine is reported to give the same products.

There has been no report that alkenyl hydroperoxides may be decomposed to epoxy-alcohols having the same carbon number as the feed hydroperoxide.

It has now been found that alkenyl hydroperoxides may be decomposed in the presence of certain materials to give epoxy-alcohols of the same carbon number as the feed hydroperoxide.

Accordingly the present invention provides a process for the production of epoxy-alcohols which comprises heating an alkenyl hydroperoxide in the presence of at least one metal selected from Groups IV-A, V-A, or VI-A of the Periodic Table or a compound thereof, with the proviso that the metal is not chromium, whereby the hydroperoxide is decomposed to give a product containing epoxy-alcohols of the same carbon number as the feed hydroperoxide, the said epoxy-alcohol being recovered from the decomposition products.

The epoxy-alcohols may be recovered from the decomposition products by distillation or water extraction.

The term compound used herein means organic or inorganic compounds or complexes containing the said metal.

Exemplary of the metal compounds which may be used as catalysts in the present process are oxides; acids, including heteropolyacids, or salts or organic esters thereof; salts of organic acids; hydroxides; hydrated oxides; inorganic salts; organic complexes; carbonyls; and hydrides. if desired the compounds may be used in their per-form, that is to say in the form derivable from reaction with hydrogen peroxide.

Suitable metals in the above-mentioned Groups are titanium, zirconium, hafnium, vanadium, niobium, tantalum, molybdenum and tungsten. Typical oxides of these metals which may be used are vanadium pentoxide niobium pentoxide and tantalum pentoxide. Typical acids are molybdic acid and tungstic acid. Typical acid salts are sodium ortho vanadate and ammonium metavanadate, whilst typical organic esters of the acids are the vanadic esters, e.g. n-butyl and n-heptyl vanadates or orthotitanate esters of which a specific example is tetra n-butyl orthotitanate. Typical salts of organic acids are vanadium naphthenate, vanadium stearate and vanadium oleate. A typical hydrated oxide is zirconium dioxide hydrate. Typical inorganic salts are vanadic sulphate $V_2(SO_4)_3$, vanadium halides e.g. $VCl_3$, zirconium nitrate or sulphate and particularly oxy-salts such vanadyl sulphate $VOSO_4$ or vanadium oxychloride $VOCl_3$. Suitable heteropoly acids and salts thereof are tungsto-vanadic acid, molybdo-vanadic acid, ammonium molybdo-vanadate and potassium tungsto-vanadate. Suitable organic complexes are vanadium, vanadyl or molybdenyl acetylacetonates, vanadium-containing complexes of quinoline, 8-hydroxyquinoline, etioporphyrins and phthalocyanins. Suitable carbonyls are molybdenum hexa-carbonyl or tungsten hexacarbonyl.

Preferred metals are vanadium, molybdenum and tungsten, and organic and inorganic compounds containing those metals are the preferred catalyst materials.

The metal compounds used may, if desired, be supported on a carrier material which is inert with respect to the reaction system e.g. pumice and kieselguhr.

It will be understood that throughout the description the term alkenyl hydroperoxides includes not only straight chain and branched chain alkenyl hydroperoxides but also cycloalkenyl hydroperoxides and aralkenyl hydroperoxides.

The hydroperoxides are decomposed in the presence of the metal or metal compound generally at temperatures in the range 0–200° C. preferably 20–150° C., the actual temperature used depending on one or more of the following criteria: the ease with which the hydroperoxide decomposes, the particular metal or metal compound used, and the time during which the hydroperoxide is in contact with the metal compound. For any particular hydroperoxide and metal compound the optimum temperature and contact time can be readily determined with a minimum of experiment.

Contact between the hydroperoxide and metal or metal compound may be effected in any one of a number of ways. For example the feed hydroperoxide may be passed at the desired temperatupre and feed rate through a column packed with the supported or unsupported metal compound, if desired together with a carrier gas such as hydrogen or nitrogen. If desired the feed may be preheated. The effluent from such a column will contain a high proportion of epoxy-alcohols having the same carbon number as the feed hydroperoxide and which may be recovered from the effluent by distillation.

Contact between the hydroperoxide and metal or metal compound may also be effected by vigorously stirring the hydroperoxide and the metal compound in a heated reaction vessel for a given period of time.

The reaction may be carried out under reflux conditions. The reaction time and temperature employed may be optimized for a given metal or metal compound and feed hydroperoxide, but generally temperatures in the region of 65° C. and reaction times of the order of 8 hrs. are suitable for a wide range of metals or metal compounds.

The alkenyl hydroperoxides which may be decomposed by the process of the invention may be either acyclic or cyclic. Alkenyl hydroperoxides are conveniently formed by the oxidation of straight chain, branched or cyclic monoolefins with molecular oxygen. Isolation of the alkenylhydroperoxide from the total crude oxidate formed is not necessary in the performance of the process of the invention and generally the preformed total oxidate containing the alkenyl hydroperoxide as reactive component will be used as the feedstock to the process. It will be understood that oxidates derived from monoolefinic hydrocarbons by oxidation with molecular oxygen which do not contain alkenyl hydroperoxides are not applicable as feedstocks to the process of the present invention.

The epoxy-alcohols produced by the process of the present invention contain the following structural group:

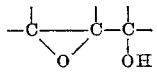

i.e. they contain a vicinal epoxy group adjacent to the carbon atom carrying the hydroxy group. They also contain the same number of carbon atoms as the olefin from which the preformed feedstock is derived. Depending on the structure of the reactive alkenyl hydroperoxide component of the feed, the epoxy-alcohols formed may have internal or terminal epoxy groups. If the alkenyl hydroperoxide contains a terminal olefinically unsaturated double bond, the epoxy-alcohol formed will have a terminal epoxy group. Alkenyl hydroperoxides containing a terminal olefinically unsaturated double bond may be derived from alpha-olefins, although it has been observed that during oxidation of olefins, including alpha-olefins, some double bond shift can and does generally occur and this can give rise to an alkenyl hydroperoxide having an internal double bond during oxidation of alpha olefins. In one particular embodiment of the invention an oxidate obtained from the liquid phase oxidation of 4-methylpentene-2 and/or 2-methylpentene-2 with molecular oxygen may be used as feedstock.

Quite apart from providing a product containing substantial proportions of epoxy-alcohols, the decomposition of alkenyl hydroperoxides according to the present invention facilitates the recovery of unreacted olefins which may be present in the oxidation product stream. Thus, for example, it is known that olefins when oxidised give rise to a mixture of oxy-compounds including alkenyl hydroperoxides, unsaturated ketones, aldehydes and alcohols and epoxides and which also contain unreacted olefin. It is highly desirable to recover such olefins for recycle to the oxidation zone in any process in which the crude oxidate is to be worked-up to desired oxy-compounds. Hitherto, the presence of the relatively unstable alkenyl hydroperoxide has rendered such recovery a hazardous and difficult operation. By the process of the invention, the hydroperoxides in such a crude oxidate mixture are decomposed to more stable epoxy-alcohols from which unreacted olefins may be recovered in a simple manner such as distillation.

If desired, the decomposition may be effected in the presence of an added organic or inorganic alkaline material, e.g. pyridine, magnesium oxide, in sufficient amount to reduce or inhibit any tendency for the epoxy-alcohols to undergo acid hydrolysis to the corresponding triol.

The invention is illustrated by the following examples.

EXAMPLE 1

A hexene fraction containing 53% 4-methylpentene-2 and 41% 2-methylpentene-2 was oxidised by molecular oxygen at 55–65° C. in the presence of 0.02 g./litre of cobalt naphthenate. The residence time of the olefin in the reactor was 7 hours. 54 g. of the oxidate which contained 11.9% wt. methylpentene hydroperoxides was refluxed in a stirred reactor in the presence of 0.10 g. of tungstic acid for nine hours in a nitrogen atmosphere. Samples were withdrawn periodically and analysed for hydroperoxide and epoxy-alcohol content. The results are set out in Table 1.

TABLE 1

| Sample | Reaction time, hr. | Sample analysis, wt. percent total crude oxidate | |
|---|---|---|---|
| | | Hydroperoxide | Total epoxy-alcohol |
| Feed | 0 | 11.9 | 0.5 |
| 1 | 1.75 | 8.3 | 3.2 |
| 2 | 5.0 | 3.5 | 7.9 |
| 3 | 9.0 | 1.0 | 10.1 |

A more complete analysis of sample 3 showed that the total oxy-compounds obtained contained:

Percent weight
2-methylpentane-2,3-epoxide _____ 26
2-methyl-2-hydroxy-pentane-3,4-epoxide _____ 8
2-methyl-4-hydroxy-pentane-2,3-epoxide _____ 30

The remainder of the oxy-products was made up of individual small amounts of ketones, alcohols and methylpentene hydroperoxides.

The epoxy-alcohols were recovered from the product by distillation.

EXAMPLE 2

54 g. of the same oxidate as prepared in Example 1 was treated with 0.11 g. of vanadium pentoxide as in Example 1. After eight hours the hydroperoxide content of the total crude oxidate had fallen to 0.5 wt. percent and the epoxy-alcohol content had risen to 11.0% wt. The oxy-compounds obtained after 8 hours contained Percent weight
2-methylpentane-2,3-epoxide _____ 29
2-methyl-2-hydroxy-pentane-3,4-epoxide _____ 12
2-methyl-4-hydroxy-pentane-2,3-epoxide _____ 32

The remainder of the oxy-products was made up of individual small amounts of ketones, alcohols and methylpentene hydroperoxides.

The epoxy-alcohols were recovered from the product by distillation.

EXAMPLE 3

A hexene fraction containing 53% 4-methylpentene-2 and 41% 2-methylpentene-2 was oxidised by molecular oxygen at 55–65° C. in the presence of 0.02 g./l. of cobalt naphthenate. The residence time of the olefin was 7 hours. 36 g. of the oxidate which contained 11.9 wt. percent methylpentene hydroperoxides was refluxed in a stirred reactor in the presence of 0.11 g. of zirconyl nitrate for 7 hours in a nitrogen atmosphere. Samples were withdrawn periodically and analysed for hydroperoxide and epoxy-alcohol content.

| Sample | Reaction time, hr. | Sample analysis, wt. percent total crude oxidate | |
|---|---|---|---|
| | | Hydroperoxide | Total epoxy-alcohol |
| Feed | 0 | 11.9 | 0.5 |
| 1 | 1 | 6.1 | -- |
| 2 | 7 | 2.1 | 7.1 |

A more complete analysis of Sample 2 showed that the total oxy-compounds obtained contained:

Percent weight
2-methylpentane-2,3-epoxide _____ 26
2-methyl-2-hydroxypentane-3,4-epoxide _____ 6
2-methyl-4-hydroxypentane-2,3-epoxide _____ 24

The remainder of the oxy-products was made up of individual small amounts of ketones, alcohols and methylpentene hydroperoxides.

The epoxy-alcohols were recovered from the product by distillation.

EXAMPLE 4

450 g. of a 1:1 mixture of 4-methylpentene-2 and 2-methylpentene-2 was oxidised by molecular oxygen at 64° C. for 24 hours. The liquid product was analysed and found to contain 22.6% wt. of methylpentene hydroperoxides. 37 g. of this oxidate was refluxed in the presence of 0.085 g. of vanadyl sulphate and 0.26 g. of magnesium oxide for 3 hours in a nitrogen atmosphere. Samples were withdrawn periodically and analysed.

| Sample | Reaction time, hr. | Sample analysis, wt. percent total crude oxidate | |
|---|---|---|---|
| | | Hydroperoxide | Total epoxy-alcohol |
| Feed | 0 | 22.6 | 0.8 |
| 1 | 1 | 2.4 | -- |
| 2 | 3 | 0.4 | 21.3 |

A more complete analysis of Sample 2 showed that the total oxy-compounds obtained contained:

Percent weight
2-methylpentane-2,3-epoxide _____ 26
2-methyl-2-hydroxypentane-3,4-epoxide _____ 16
2-mehtyl-4-hydroxypentane-2,3-epoxide _____ 33

The remainder of the oxy-products was made up of small amounts of ketones, alcohols and methylpentene hydroperoxides.

The epoxy-alcohols were recovered by distillation.

In the following examples, an oxidate was prepared by oxidising a 4-methylpentene-2/2-methylpentene-2 mixture unless otherwise stated. The percent weight of methylpentene hydroperoxides in the total oxidate is set out in the Table A below together with the percent decomposition of the hydroperoxide. The Table A also records the total weight of epoxy-alcohols present in the product as a percentage of the oxy-compounds present, the percent set out being the total 2-methyl-2-hydroxy-pentane-3,4-epoxide and 2-methyl-4-hydroxy-pentane-2,3-oxide present. The epoxy-alcohols were recovered from the products by distillation. Those examples marked (a) were carried out using an oxidate obtained by oxidising 4-methylpentene-2.

TABLE A

| Ex. | Catalyst | Initial hydroperoxide in total oxidate (percent wt.) | Hydroperoxide decomposition (percent) | Hours on stream | Temp., ° C. | Epoxy-alcohols in product oxy-compounds (percent wt.) |
|---|---|---|---|---|---|---|
| 5 | Vanadium metal | 20.7 | 96.6 | 6.75 | 65 | 44.9 |
| 6 | Meta-vanadic acid | 10.7 | 99.2 | 7 | 65 | 37.2 |
| 7 | Sodium meta-vanadate | 10.7 | 89.0 | 4 | 65 | 41.9 |
| 8 | Sodium ortho-vanadate | 10.7 | 91.6 | 8.5 | 65 | 41.9 |
| 9 | Vanadium carbide | 23.4 | 96.4 | 6.75 | 65 | 49.2 |
| 10 | Vanadium sulphate +pyridine | 22.8 | 99.5 | 4 | 65 | 44.0 |
| 11 | Vanadyl acetylacetonate | 10.1 (a) | 91.1 | 1 10 | 55 | 70.0 |
| 12 | Vanadium III acetylacetonate | 22.6 (a) | 88.3 | 1 10 | 55 | 46.3 |
| 13 | Vanadium naphthenate | 10.1 (a) | 86.6 | 2.5 | 55 | 69.0 |
| 14 | Vanadium trichloride | 20.1 | 98.4 | 1 10 | 65 | 42.8 |
| 15 | Vanadyl etioporphyrin | 20.1 | 89.4 | 14 | 65 | 39.2 |
| 16 | Titanium dioxide +water | 10.7 | 55.1 | 15 | 65 | 26.7 |
| 17 | Orthotitanic acid | 10.7 | 77.6 | 7.5 | 65 | 25.7 |
| 18 | Tetra-n-butyl ortho-titanate | 20.1 | 88.5 | 7 | 65 | 37.7 |
| 19 | Zirconium dioxide hydrate | 10.7 | 74.2 | 10 | 65 | 30.7 |
| 20 | Zirconium acetylacetonate | 20.7 | 21.9 | 21.25 | 65 | 46.7 |
| 21 | Zirconyl nitrate | 22.4 | 42.6 | 30 | 65 | 18.3 |
| 22 | Molybdenum trioxide | 22.6 | 70 | 6.5 | 65 | 42.9 |
| 23 | Ammonium molybdate | 10.1 (a) | 90.9 | 10.75 | 55 | 35.6 |
| 24 | Molybdenum hexacarbonyl | 20.1 | 89.2 | 7.25 | 65 | 24.4 |
| 25 | Molybdenum disulphide | 20.5 | 55.5 | 20.25 | 65 | 24.2 |
| 26 | Molybdenum metal | 23.4 | 90.7 | 21.75 | 65 | 17.2 |
| 27 | Tungsten hexacarbonyl | 20.7 | 77.8 | 14.5 | 65 | 33.2 |
| 28 | Ammonium vandotungstate | 23.4 | 99.4 | 7.75 | 65 | 49.9 |
| 29 | Tungsto-silicic acid +magnesium oxide | 22.4 | 29.6 | 17.5 | 65 | 14.7 |
| 30 | Tungsto-phosphoric acid +magnesium oxide | 22.8 | 43.2 | 17.5 | 65 | 18.2 |
| 31 | Niobium acetylacetonate | 23.4 | 66.8 | 29 | 65 | 27.2 |
| 32 | Niobium pentachloride | 23.4 | 60 | 35 | 65 | 27.1 |
| 33 | Niobic acid | 23.4 | 46.5 | 30.25 | 65 | 16.9 |
| 34 | Penta-n-butylortho niobate | 28.2 | 55 | 34.24 | 65 | 21.4 |
| 35 | Tantalum pentoxide | 22.4 | 53.3 | 18.25 | 65 | 18.7 |
| 36 | Tantalic acid | 23.4 | 68.8 | 30.25 | 65 | 32.6 |
| 37 | Tantalum pentachloride | 21.6 | 36.7 | 24.75 | 65 | 15.4 |
| 38 | Hafnium dioxide | 20.7 | 84.6 | 21.25 | 65 | 16.8 |
| 39 | Uranium acetylacetonate | 23.4 | 55.7 | 27 | 65 | 20.2 |
| 40 | Thorium IV acetylacetonate | 23.4 | 55.6 | 27 | 65 | 33.4 |
| 41 | Cobalt naphthenate | 22.8 | 93.6 | 4.25 | 65 | 7.2 |
| 42 | Chromic hydroxide | 23.4 | 64.3 | 28.75 | 65 | 7.9 |
| 43 | Chromium naphthenate | 21.1 | 59.1 | 30.25 | 65 | 9.3 |
| 44 | Chromic acetylacetonate | 20.1 | 65.3 | 19.75 | 65 | 9.8 |

1 Minutes.

For the sake of comparison, Examples 41–44 illustrate the decomposition of alkenyl hydroperoxides in the presence of metal compounds not within the scope of the present invention.

It will be seen that even with high percentage decomposition of the hydroperoxide the amount of epoxy-alcohol formed is very small compared with that formed using metals and compounds according to the present invention.

In Table B, more detailed feed and product analyses are given for representative examples illustrated in Table A.

TABLE B

| Ex. | Feed, percent wt. Olefin | Feed, percent wt. ROOH | Product, percent wt. Olefin | Product, percent wt. ROOH | Oxy-cpd. distribution in feed, percent wt. ROOH | Oxy-cpd. distribution in feed, percent wt. Oxide | Oxy-cpd. distribution in feed, percent wt. Unsaturated alcohols | Oxy-cpd. distribution in product, percent wt. ROOH | Oxy-cpd. distribution in product, percent wt. Oxide | Oxy-cpd. distribution in product, percent wt. Unsaturated alcohols | Oxy-cpd. distribution in product, percent wt. Epoxy-alcohols |
|---|---|---|---|---|---|---|---|---|---|---|---|
| 5 | 63.3 | 20.7 | 62.4 | 0.7 | 56.5 | 23.5 | 6.8 | .2 | 23.3 | 17.9 | 44.9 |
| 6 | 80.7 | 10.7 | 81.6 | 0.1 | 55.4 | 21.0 | 4.4 | 0.3 | 18 | 21.2 | 37.2 |
| 9 | 60.9 | 23.4 | 59.5 | 0.8 | 59.8 | 21.5 | 5.6 | 1.9 | 21.4 | 13.5 | 49.2 |
| 10 | 59.9 | 22.8 | 57 | 0.1 | 56.9 | 21.8 | 9.4 | 0.3 | 24.2 | 19.0 | 44.0 |
| 11 | 86.4 | 10.1 | 87.8 | 0.9 | 74.2 | 4.1 | 5.6 | 7.4 | 5.7 | 6.7 | 70.0 |
| 13 | 86.4 | 10.1 | 85.4 | 1.4 | 74.2 | 4.1 | 5.6 | 9.6 | 4.9 | 5.8 | 69.0 |
| 14 | 63.3 | 20.1 | 67.2 | 0.3 | 54.8 | 23.5 | 7.8 | 0.9 | 24.3 | 20.8 | 42.8 |
| 15 | 63.3 | 20.1 | 61.8 | 2.1 | 54.8 | 23.5 | 7.8 | 5.5 | 24.1 | 17.1 | 39.2 |
| 18 | 63.3 | 20.1 | 63.9 | 2.3 | 54.8 | 23.5 | 7.8 | 6.4 | 24.8 | 18.1 | 37.7 |
| 19 | 80.7 | 10.7 | 87.7 | 2.8 | 55.4 | 21.0 | 4.4 | 22.7 | 17.3 | 6.0 | 30.7 |
| 23 | 86.4 | 10.1 | 90.5 | 0.9 | 74.2 | 4.1 | 5.6 | 9.5 | 11.5 | 31.2 | 35.6 |
| 24 | 63.3 | 20.1 | 61.0 | 4.2 | 54.8 | 23.5 | 7.8 | 10.8 | 27.5 | 27.4 | 24.4 |
| 25 | 63.3 | 20.5 | 62.7 | 9.2 | 55.8 | 23.5 | 7.5 | 24.7 | 21.8 | 23.6 | 24.2 |
| 26 | 60.9 | 23.4 | 57.2 | 2.2 | 59.8 | 21.5 | 5.6 | 5.1 | 26.1 | 39.3 | 17.2 |
| 27 | 63.3 | 20.7 | 67.0 | 4.6 | 56.5 | 23.5 | 6.8 | 13.9 | 25.4 | 17.1 | 33.2 |
| 28 | 60.9 | 23.4 | 60.0 | 0.1 | 59.8 | 21.5 | 5.6 | 0.3 | 21.3 | 15.3 | 49.9 |
| 29 | 63.3 | 22.4 | 57.5 | 15.8 | 61.0 | 23.6 | 2.4 | 37.1 | 22.5 | 12.2 | 14.7 |
| 30 | 63.3 | 22.8 | 61.2 | 13.0 | 62.1 | 23.6 | 1.2 | 33.7 | 22.9 | 11.5 | 18.2 |
| 35 | 63.3 | 22.4 | 55.6 | 10.5 | 61.0 | 23.6 | 2.4 | 23.6 | 24.9 | 21.2 | 18.7 |
| 41 | 59.9 | 22.8 | 55.3 | 1.5 | 56.9 | 21.8 | 9.4 | 33.6 | 22.7 | 26.2 | 7.2 |
| 42 | 60.9 | 23.4 | 57.8 | 8.4 | 59.8 | 21.5 | 5.6 | 19.9 | 9.2 | 52.5 | 7.9 |
| 43 | 63.3 | 21.1 | 55.3 | 2.4 | 57.5 | 23.2 | 6.6 | 6.5 | 25.2 | 54.4 | 9.3 |
| 44 | 63.3 | 20.1 | 65.0 | 7.0 | 54.8 | 23.5 | 7.8 | 20.0 | 21.6 | 38.5 | 9.8 |

ROOH represents alkenyl hydroperoxide.

Table B illustrates the fact that it is not necessary to isolate the hydroperoxide component from the preformed total oxidate and shows that only the hydroperoxide undergoes reaction during the process of the invention.

EXAMPLE 45

This example further illustrates that it is the hydroperoxide component of the preformed feedstock which is the reactive component and which decomposes to form the epoxy-alcohols. The data is set out in Table C. The term "feed" refers to an oxidate derived from a methylpentene fraction containing approximately 97% by weight of 4-methylpentene-2. Two decomposition runs were effected with this feed leading to Product (1) and Product (2). 50 mls. of the oxidate is reacted in the presence of 0.05 gms. of vanadyl acetylacetonate for 30 mins. at 58° C. in each run.

TABLE C

| | Feed | Product (1) | Product (2) |
|---|---|---|---|
| Olefin | 84.25 | 84.20 | 84.20 |
| Hydroperoxides | 11.47 | Nil | Nil |
| 3,4-epoxy-2-methylpentanol-2 | Nil | 6.28 | 6.38 |
| 3,4-epoxy-4-methylpentanol-2 | Nil | 4.74 | 4.94 |
| 2,3-epoxy-4-methylpentane | 1.11 | 1.22 | 1.16 |
| 2-methylpentanol-2 | Nil | 0.87 | 0.88 |
| Unsat. primary alcohols | 0.18 | 0.16 | 0.21 |
| Unsat. alcohols having a methyl isobutyl carbinol skeleton | 0.25 | 0.28 | 0.23 |
| Low boiling material | 1.08 | 1.09 | 1.06 |
| Other materials (unidentified) | 0.51 | 0.36 | 0.40 |

In a further experiment, the preformed feed used in Example 45 was distilled in the presence of benzene to remove the unreacted olefin present and form a solution of 87.64% benzene and 9.66% hydroperoxides. This hydroperoxide content represents content of 78% based on the total oxy-compounds present. The benzene solution is reacted as in Example 45 and gives a product containing 88.9% benzene, 0.15% hydroperoxides, 4.31% 3,4-epoxy-2-methylpentanol-2, 4.76% 3,4-epoxy-4-methylpentanol-2, 0.3% 2-methylpentanol-2 and 0.19% unsaturated alcohols having a methyl isobutyl carbinol carbon skeleton.

EXAMPLES 46–55

Examples 46 to 55 illustrate the applicability of the process of the present invention to a wide range of preformed feedstocks derived from a selection of branched chain olefins, straight chain olefins and cyclic olefins. The preformed feedstocks in each example were obtained by the liquid phase oxidation of the olefin identified with molecular oxygen. The data relating to these examples is summarized in Table D.

TABLE D

| Ex. | Olefin | Catalyst | Initial hydroperoxide in preformed feedstock, percent wt. | Unreacted olefin in preformed feedstock, percent wt. | Hydroperoxide in decomposed total product | Hours on stream | Temp., °C. | Epoxyalcohols in product oxycompounds, percent wt. |
|---|---|---|---|---|---|---|---|---|
| 46 | 3-methylpentene-2 | Vanadyl acetylacetonate | 6.4 | 79.6 | 0.3 | 1.5 | 68 | (A) 33.5 |
| 47 | 3-methylpentene-1 | do | 3.98 | 92.6 | 0.04 | 1.5 | 54 | (B) 31.5 |
| 48 | 2-methylpentene-2 | do | 10.4 | 78.6 | 0.15 | 0.5 | 67 | (C) 49.0 |
| 49 | Hexene-2 | do | 4.4 | 95.7 | 0.04 | 1.5 | 68 | (D) 42.4 |
| 50 | Hexene-1 | do | 1.9 | 97.5 | Nil | 1.5 | 64 | (E) 23.3 |
| 51 | 2-methylpentene-1 | do | 0.65 | 95.1 | Nil | 1.5 | 62 | (F) 37.5 |
| 52 | Decene-1 | do | 4.5 | 86.2 | 0.02 | 1.5 | 85 | (G) 17.3 |
| 53 | Cyclopentene | n-Heptyl vanadate | 15.4 | ¹85 | 0.1 | 4.0 | 44 | (H) 21.0 |
| 54 | Cyclohexene | Vanadium III acetylacetonate | 9.9 | ¹85 | 0.2 | 2.0 | 83 | (I) 20.0 |
| 55 | Hexene-3 | do | 3.37 | 94.5 | 0.4 | 1.17 | 62 | (J) 72.5 |

¹ Approximate.
(A) is a mixture of 2,3-epoxy-3-ethyl-butanol-1; 3,4-epoxy-3-methylpentanol-2; 2,3-epoxy-3-methylpentanol-1 and 1,2-epoxy-2-ethylbutanol-3.
(B) is a mixture of 2,3-epoxy-3-methylpentanol-1 and 1,2-epoxy-3-methylpentanol-3.
(C) is a mixture of 3,4-epoxy-2-methylpentanol-2 and 2,3-epoxy-2-methylpentanol-4.
(D) is a mixture of 2,3-epoxy-hexanol-4 and 2,3-epoxy-hexanol-1.
(E) is predominantly 2,3-epoxy-hexanol-4.
(F) is a mixture of 3,4-epoxy-2-methylpentanol-2 and 2,3-epoxy-2-methylpentanol-4.
(G) is predominantly 2,3-epoxy-decanol-1.
(H) is 2,3-epoxy-cyclopentanol.
(I) is 2,3-epoxy-cyclohexanol.
(J) is a mixture of 2,3-epoxy-hexanol-4 and 3,4-epoxy-hexanol-2.

It should be noted that the products of Examples 46 and 47 contain epoxy-alcohols having a terminal epoxy group.

We claim:

1. A process for the decomposition of alkenyl hydroperoxides resulting in the production of decomposition products containing epoxyalcohols having a vicinal epoxy group adjacent to a carbon atom carrying a hydroxyl group, comprising: heating a preformed feedstock derived from a mono-olefinic hydrocarbon selected from the group consisting of straight-chain mono-olefins, branched-chain mono-olefins and cyclic mono-olefins by oxidation of said olefin with molecular oxygen, said preformed feedstock containing as the reactive component a mono-alkenyl hydroperoxide, in the presence of a catalyst selected from the group consisting of titanium, zirconium, hafnium, thorium, vanadium, niobium, tantalum, uranium, molybdenum, tungsten and componds thereof, to decompose said alkenyl hydroperoxide and form decomposition products which contain epoxyalcohols.

2. A process according to claim 1, in which the compounds used as catalyst are selected from the group consisting of oxides, acids, salts of said acids, organic esters of said acids, heteropoly acids, salts of organic acids, hydroxides, hydrated oxides, inorganic salts, organic complexes, carbonyls and hydrides.

3. A process according to claim 1, in which the preformed feedstock is heated to a temperature in the range 20–150° C.

4. A process according to claim 1, in which the preformed feedstock is an oxidate derived from the liquid phase oxidation of an olefin selected from the group consisting of 2-methylpentene-2, 4-methylpentene-2 and mixtures thereof, with molecular oxygen.

5. A process according to claim 1, in which the preformed feedstock is an oxidate derived from the liquid phase oxidation of an olefin selected from the group consisting of hexene-2 and hexene-3 with molecular oxygen.

6. A process according to claim 1, in which the preformed feedstock is an oxidate derived from the liquid phase oxidation of an olefin selected from the group consisting of cyclopentene and cyclohexene with molecular oxygen.

7. A process according to claim 1, in which the catalyst used is selected from the group consisting of vanadium naphthenate and vanadyl acetylacetonate.

8. A process according to claim 1, in which the decomposition is carried out in the presence of an added alkaline material.

9. A process according to claim 1, in which the epoxyalcohols are recovered from the decomposition products by distillation.

10. A process according to claim 1, in which the epoxyalcohols are recovered from the decomposition products by water extraction.

References Cited

FOREIGN PATENTS 641,452  6/1964  Belgium.

NORMA S. MILESTONE, Primary Examiner

U.S. Cl. X.R

260—610, 601, 597, 632, 617, 586, 598

PO-1050
(5/69)

UNITED STATES PATENT OFFICE
CERTIFICATE OF CORRECTION

Patent No. 3,505,360     Dated April 7, 1970

Inventor(s) Kenneth Allison et al

It is certified that error appears in the above-identified patent and that said Letters Patent are hereby corrected as shown below:

Table B (columns 7-8), the entry for Ex. 18 of "24.8" in the third tabular column from the right should be - - 24.9 - -.

SIGNED AND SEALED
AUG 11 1970

(SEAL)
Attest:

Edward M. Fletcher, Jr.
Attesting Officer

WILLIAM E. SCHUYLER, JR.
Commissioner of Patents